Patented July 30, 1946

2,405,011

UNITED STATES PATENT OFFICE 2,405,011

VITREOUS COMPOSITIONS

Guenther Buechner, Scotia, N. Y., assignor to General Electric Company, a corporation of New York No Drawing. Application July 1, 1942, Serial No. 449,329

6 Claims. (Cl. 106—46)

The present invention relates particularly to electrically insulating molded products and comprises new compositions of the mycalex class. It is made up of finely divided mica and ingredients which, in combination with the finely divided mica, form strong, hard products.

As a consequence of my invention, I have provided improved compositions of this type which are characterized by improved electrical and physical properties, and in particular by high dielectric strength, low power factor, low dielectric constant, excellent machinability and improved mechanical strength.

In accordance with one of the main features of novelty of my invention, mica or the like is associated with a quantity of a fluorine compound, such as cryolite, together with boric acid or its anhydride, $B_2O_3$. In accordance with another feature, these materials are mixed in the raw or uncombined state and thereafter are subjected to a firing step which results in chemical combination. This is a decided advantage from a production standpoint as the cost of the step of preparing a frit and comminuting it is saved.

In carrying out my invention the following ingredients are mixed in a comminuted state, the proportions being by weight:

| | Parts |
|---|---|
| Mica | 70 |
| Cryolite | 15 |
| Boric acid ($H_3BO_3$) | 27 |

In place of cryolite, other fluorides may be used, such as an alkali fluoride or an alkali silico-fluoride.

The proportions given are illustrative only, and hence I do not wish to be limited thereto.

The proportion of cryolite, or its equivalent, and the boric acid and the proportion of mica to the other two ingredients may be varied over a considerable range in accordance with the plasticity desired for different purposes. The degree of plasticity should vary in accordance with the conditions of molding and the configuration of the mold. When employing about 27 parts of boric acid, the loss of water from the molecule upon heating leaves about 15 parts by weight of the anhydride, $B_2O_3$, the amounts of cryolite and boric anhydride thus being substantially equal.

These ingredients are mixed with sufficient water to form a smooth, homogeneous, semi-solid, moldable mass, four parts of water by weight ordinarily being suitable. Blanks may be formed readily from the wet mixture. After drying, the blanks are heated to about 450° C. in order to drive off water from the boric acid. The temperature then is raised to about 625 to 650° C. At this temperature a chemical reaction takes place, and fluorine gas is given off which chemically attacks and combines with the mica forming a homogeneous, non-stratified composition. The material takes on a reddish color and becomes extremely plastic. Conveniently, the heated plastic blank is pushed immediately into a mold and formed under pressure into desired shape. Preferably the hot composition, while still substantially at 625 to 650° C., is put into molds heated to about 400° C. where it is molded under pressure. The hot molded parts may be transferred to molds at lower temperature where they cool to rigidity.

Instead of preparing molded blanks, the mixture of mica, cryolite and boric acid may be heated as a formless mass to a temperature sufficiently high to drive off combined water and sinter the mass. The sintered product then may be powdered and subsequently mixed with enough water to facilitate molding. Blanks are prepared from this wet mass which, upon drying, are heated to cause chemical combination to be completed, that is, to about 625 to 650° C., and then are molded preferably in heated molds.

The plastic heated mass may be shaped into desired complicated shaped articles by injection of the hot plastic mass into a mold of desired form. The finished product is strong, hard, has a metallic lustre, is dark red in color, and is free from chalkiness on its surface. It is readily machinable. The most difficult operations in this kind of material are the tapping of holes and the screw-threading of rods. These operations can be carried out readily with my new material due to the absence of stratification.

The dielectric strength is high, being on the average about 650 volts per mil measured on material of .135 inch thickness. However, higher values of dielectric strength are obtainable. The dielectric strength is much higher than that of porcelain, which on the average is about 280 volts per mil.

The power factor of the material is extremely low, being about .003 when dry. Even after immersion in water of the product for a number of days, the power factor is raised but very little or not at all. The material is chemically resistant to alkaline and saline solutions.

This material has wide commercial utility, but is particularly applicable as an insulator in high frequency apparatus and for insulating purposes requiring high dielectric strength. It is particularly adapted for employment in radio devices because of its low power factor in a high frequency electric field even under moist conditions and its lower dielectric constant than other micaceous materials. Its low weight, which is about .094 pound per cubic inch, makes it adaptable for aircraft insulating purposes.

What I claim as new and desire to secure by Letters Patent of the United States is:

1. A vitreous material comprising a product of a composition consisting of mica, cryolite and boric acid heat-reacted in intimate admixture in a finely divided state, said material being characterized by a homogeneous structure, high dielectric strength and low power factor in a high frequency field.

2. A vitreous material comprising heat-reacted product of a mixture consisting of substantially equal parts by weight of cryolite and boric anhydride, and a preponderant proportion of finely divided mica, said material being homogeneous and machinable, having a dielectric strength higher than porcelain and when exposed to water being substantially unaffected in power factor.

3. The method of making a vitreous material which consists in forming a mixture consisting of (1) mica, (2) a fluoride selected from the class consisting of cryolite, alkali fluorides and alkali silicofluorides, and (3) boric acid, all being in a finely divided state, heating said mixture to a temperature sufficiently high to cause chemical reaction, and molding the resulting product to desired configuration.

4. The method of making a vitreous material which consists in forming an intimate mixture consisting by weight of about 70 parts of comminuted mica, about 15 parts of cryolite and about 15 parts of boric anhydride, heating to about 625 to 650° C. to effect chemical reaction and molding the resulting product under pressure.

5. A vitreous material comprising the heat-reacted product of a mixture consisting by weight of about 70 parts finely divided mica, about 15 parts cryolite and about 15 parts boric anhydride.

6. The method of making a mycalex product which consists in intimately mixing ingredients consisting of finely divided mica, cryolite and boric acid, each of the said ingredients being present in the mixture in substantial amounts, the mica preponderating by weight over the combined weight of the other ingredients, heating to a reaction temperature of about 625 to 650° C., whereby a plastic composition is formed, and molding said composition to desired form under pressure at an elevated temperature.

GUENTHER BUECHNER.